US009444608B2

(12) United States Patent
Xu et al.

(10) Patent No.: US 9,444,608 B2
(45) Date of Patent: Sep. 13, 2016

(54) CONTROL CHANNEL TRANSMISSION METHOD AND APPARATUS TO IMPLEMENT TRANSMISSION OF EPDCCHS THROUGH AN EREG IN A UNIT PHYSICAL RESOURCE BLOCK

(71) Applicant: Huawei Device Co., LTD, Shenzhen (CN)

(72) Inventors: Kai Xu, Beijing (CN); Jian Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 326 days.

(21) Appl. No.: 14/021,801

(22) Filed: Sep. 9, 2013

(65) Prior Publication Data

US 2014/0029542 A1    Jan. 30, 2014

Related U.S. Application Data

(63) Continuation of application No. PCT/CN2012/081545, filed on Sep. 18, 2012.

(30) Foreign Application Priority Data

Jul. 26, 2012  (WO) ............... PCT/CN2012/079198

(51) Int. Cl.
*H04W 4/00*     (2009.01)
*H04L 5/00*     (2006.01)

(52) U.S. Cl.
CPC ........... *H04L 5/0092* (2013.01); *H04L 5/0053* (2013.01); *H04L 5/0007* (2013.01)

(58) Field of Classification Search
CPC ..................... H04L 5/0092; H04L 5/0053
See application file for complete search history.

(56) References Cited

U.S. PATENT DOCUMENTS

2008/0261582 A1\* 10/2008 Sarkar ................. H04L 12/189
455/422.1
2013/0039284 A1\* 2/2013 Marinier ................ H04L 5/001
370/329

(Continued)

FOREIGN PATENT DOCUMENTS

CN     102368759 A     3/2012
CN     102395206 A     3/2012

(Continued)

OTHER PUBLICATIONS

LTE, 3rd Generation Partnership Project; Technical Specification Group Radio Access Network; Evolved Universal Terrestrial Radio Access (E-UTRA); Physical Channels and Modulation (Release 8), 3GPP TS 36.211 v8.9.0, Dec. 2009, 67 pages.

(Continued)

*Primary Examiner* — Abdelnabi Musa
(74) *Attorney, Agent, or Firm* — Slater Matsil, LLP

(57) ABSTRACT

Embodiments provide a control channel transmission method and apparatus. A control channel is mapped to an eREG. That corresponds to determined eREG information, among a designated number of eREGs in each unit physical resource block. Each eREG among the designated number of the eREGs is formed by a designated number of resource elements. The designated number of the resource elements are selected from corresponding resource elements at an $S^{th}$ position in each group. S is a positive integer smaller than or equal to N. The control channel can be transmitted on the mapped eREG.

14 Claims, 7 Drawing Sheets

(56) References Cited

U.S. PATENT DOCUMENTS

| | | | |
|---|---|---|---|
| 2013/0242890 A1* | 9/2013 | He | H04L 5/1469 370/329 |
| 2014/0056279 A1* | 2/2014 | Chen | H04W 52/04 370/330 |
| 2014/0071934 A1* | 3/2014 | Frenne | H04L 5/001 370/330 |
| 2014/0169328 A1* | 6/2014 | Ahimezawa | H04B 7/0452 370/330 |
| 2014/0204849 A1 | 7/2014 | Chen et al. | |
| 2015/0003349 A1* | 1/2015 | Kim | H04W 72/042 370/329 |
| 2015/0131565 A1 | 5/2015 | Nakashima et al. | |
| 2015/0139109 A1* | 5/2015 | Seo | H04W 72/042 370/329 |

FOREIGN PATENT DOCUMENTS

| | | |
|---|---|---|
| CN | 102420685 A | 4/2012 |
| CN | 102594513 A | 7/2012 |
| CN | 102611524 A | 7/2012 |
| WO | 2011025202 A2 | 3/2011 |
| WO | 2012068125 A1 | 5/2012 |

OTHER PUBLICATIONS

LTE, "3rd Generation Partnership Project; Technical Specification Group Radio Access Network; Evolved Universal Terrestrial Radio Access (E-UTRA); Physical Channels and Modulation (Release 9)," 3GPP TS 36.211 v9.1.0, Mar. 3, 2010, 59 pages.

International Search Report received on Application No. PCT/CN2012/079198, mailed Apr. 25, 2013, 10 pages.

International Search Report received on Application No. PCT/CN2012/081545, mailed May 2, 2013, 10 pages.

Ericsson, ST-Ericsson, "Details of Multiplexing of DCI Messages," 3GPP TSG-RAN WG1 #68bis, R1-121023, Jeju, Republic of Korea, Mar. 26-30, 2012, 3 pages.

HTC, "eREG and eCCE Definitions for ePDCCH," 3GPP TSG-RAN WG1 #69, R1-122331, Prague, Czech Republic, May 21-25, 2012, 6 pages.

Texas Instruments, "Handling of ePDCCH Mapping in the Presence of Other Signals," 3GPP TSG RAN WG1 Meeting #69, R1-122741, Prague, Czech Republic, May 21-25, 2012, 2 pages.

NEC Group, "ePDCCH Transmission Schemes and Performance Evaluations," 3GPP TSG RAN WG1 Meeting #69, R1-122597, May 21-25, 2012, 7 pages.

Ericsson, et al., "DCI multiplexing by eREG," 3GPP TSG-RAN WG1#69, R1-122001, Prague, Czech Republic, May 21-25, 2012, 4 pages.

Fujitsu, "Definition of eREG and eCCE," 3GPP TSG RAN WG1 Meeting #69, R1-122068, Prague, Czech Republic, May 21-25. 2012, 4 pages.

Interdigital Communications, LLC., "On ePDCCH Reference Signal," G RAN WG1 Meeting #68bis, R1-121317, Jeju, Korea, Mar. 26-30, 2012, 4 pages.

Mediatek Inc., "Physical Structure for DCI Multiplexing in ePDCCH," 3GPP TSG-RAN WG1 #69, R1-122166, Prague, Czech, May 21-25, 2012, 6 pages.

NEC Group, "ePDCCH search space design," 3GPP TSG RAN WG1 Meeting #69, R1-122595, Prague, Czech Republic, May 21-25, 2012, 10 pages.

Chinese Search Report received in Application No. 201280002923.X, mailed Jan. 20, 2014, 7 pages.

Ericsson et al., "On Reference Signal Design for Enhanced Control Channels," 3GPP TSG-RAN WG1 #68, R1-120076, Feb. 6-10, 2012, 5 pages, Dresden, Germany.

Interdigitsal Communications, LLC: "Antenna Port Association for ePDCCH Transmission," 3GPP TSG RAN WG1 Meeting #69, R1-122555, May 21-25, 2012, 5 pages, Prague, Czech Republic.

Interdigital et al.: "WF on ePDCCH," 3GPP TSG RAN WG1 #69, R1-122907, May 21-25, 2012, 3 pages, Prague, Czech Republic.

* cited by examiner

| 1 | 1 | 1 | 1 | 13 | | | 19 | 19 | 19 | 19 | 31 | | |
|---|---|---|---|----|---|---|----|----|----|----|----|---|---|
| 2 | 2 | 2 | 2 | 13 | | | 20 | 20 | 20 | 20 | 31 | | |
| 3 | 3 | 3 | 3 | 13 | 16 | 16 | 21 | 21 | 21 | 21 | 31 | 34 | 34 |
| 4 | 4 | 4 | 4 | 13 | 16 | 16 | 22 | 22 | 22 | 22 | 31 | 34 | 34 |
| 5 | 5 | 5 | 5 | 14 | 17 | 17 | 23 | 23 | 23 | 23 | 32 | 35 | 35 |
| 6 | 6 | 6 | 6 | 14 | | | 24 | 24 | 24 | 24 | 32 | | |
| 7 | 7 | 7 | 7 | 14 | | | 25 | 25 | 25 | 25 | 32 | | |
| 8 | 8 | 8 | 8 | 14 | 17 | 17 | 26 | 26 | 26 | 26 | 32 | 35 | 35 |
| 9 | 9 | 9 | 9 | 15 | 18 | 18 | 27 | 27 | 27 | 27 | 33 | 36 | 36 |
| 10 | 10 | 10 | 10 | 15 | 18 | 18 | 28 | 28 | 28 | 28 | 33 | 36 | 36 |
| 11 | 11 | 11 | 11 | 15 | | | 29 | 29 | 29 | 29 | 33 | | |
| 12 | 12 | 12 | 12 | 15 | | | 30 | 30 | 30 | 30 | 33 | | |

| 1 | 4 | 7 | 10 | 13 |    |    | 19 | 22 | 25 | 28 | 31 |    |    |
|---|---|---|----|----|----|----|----|----|----|----|----|----|----|
| 1 | 4 | 7 | 10 | 13 |    |    | 19 | 22 | 25 | 28 | 31 |    |    |
| 1 | 4 | 7 | 10 | 13 | 16 | 16 | 19 | 22 | 25 | 28 | 31 | 34 | 34 |
| 1 | 4 | 7 | 10 | 13 | 16 | 16 | 19 | 22 | 25 | 28 | 31 | 34 | 34 |
| 2 | 5 | 8 | 11 | 14 | 17 | 17 | 20 | 23 | 26 | 29 | 32 | 35 | 35 |
| 2 | 5 | 8 | 11 | 14 |    |    | 20 | 23 | 26 | 29 | 32 |    |    |
| 2 | 5 | 8 | 11 | 14 |    |    | 20 | 23 | 26 | 29 | 32 |    |    |
| 2 | 5 | 8 | 11 | 14 | 17 | 17 | 20 | 23 | 26 | 29 | 32 | 35 | 35 |
| 3 | 6 | 9 | 12 | 15 | 18 | 18 | 21 | 24 | 27 | 30 | 33 | 36 | 36 |
| 3 | 6 | 9 | 12 | 15 | 18 | 18 | 21 | 24 | 27 | 30 | 33 | 36 | 36 |
| 3 | 6 | 9 | 12 | 15 |    |    | 21 | 24 | 27 | 30 | 33 |    |    |
| 3 | 6 | 9 | 12 | 15 |    |    | 21 | 24 | 27 | 30 | 33 |    |    |

FIG. 3

| 1 | 1 | 7  | 7  | 13 |    |    | 13 | 22 | 22 | 28 | 28 |    |    |
|---|---|----|----|----|----|----|----|----|----|----|----|----|----|
| 1 | 1 | 7  | 7  | 13 |    |    | 13 | 22 | 22 | 28 | 28 |    |    |
| 2 | 2 | 8  | 8  | 14 | 14 | 15 | 15 | 23 | 23 | 29 | 29 | 34 | 34 |
| 2 | 2 | 8  | 8  | 14 | 14 | 15 | 15 | 23 | 23 | 29 | 29 | 34 | 34 |
| 3 | 3 | 9  | 9  | 16 | 17 | 17 | 18 | 24 | 24 | 30 | 30 | 35 | 35 |
| 3 | 3 | 9  | 9  | 16 |    |    | 18 | 24 | 24 | 30 | 30 |    |    |
| 4 | 4 | 10 | 10 | 16 |    |    | 18 | 25 | 25 | 31 | 31 |    |    |
| 4 | 4 | 10 | 10 | 16 | 17 | 17 | 18 | 25 | 25 | 31 | 31 | 35 | 35 |
| 5 | 5 | 11 | 11 | 19 | 19 | 20 | 20 | 26 | 26 | 32 | 32 | 36 | 36 |
| 5 | 5 | 11 | 11 | 19 | 19 | 20 | 20 | 26 | 26 | 32 | 32 | 36 | 36 |
| 6 | 6 | 12 | 12 | 21 |    |    | 21 | 27 | 27 | 33 | 33 |    |    |
| 6 | 6 | 12 | 12 | 21 |    |    | 21 | 27 | 27 | 33 | 33 |    |    |

FIG. 4

| 1(7) | 1(8) | 1(9) | 1(10) | 13(7) | | | 19(7) | 19(8) | 19(9) | 19(10) | 31(7) | | |
|---|---|---|---|---|---|---|---|---|---|---|---|---|---|
| 2(7) | 2(8) | 2(9) | 2(10) | 13(8) | | | 20(7) | 20(8) | 20(9) | 20(10) | 31(8) | | |
| 3(7) | 3(8) | 3(9) | 3(10) | 13(9) | 16(7) | 16(8) | 21(7) | 21(8) | 21(9) | 21(10) | 31(9) | 34(7) | 34(8) |
| 4(7) | 4(8) | 4(9) | 4(10) | 13(10) | 16(9) | 16(10) | 22(7) | 22(8) | 22(9) | 22(10) | 31(10) | 34(9) | 34(10) |
| 5(7) | 5(8) | 5(9) | 5(10) | 14(7) | 17(7) | 17(8) | 23(7) | 23(8) | 23(9) | 23(10) | 32(7) | 35(7) | 35(8) |
| 6(7) | 6(8) | 6(9) | 6(10) | 14(8) | | | 24(7) | 24(8) | 24(9) | 24(10) | 32(8) | | |
| 7(7) | 7(8) | 7(9) | 7(10) | 14(9) | | | 25(7) | 25(8) | 25(9) | 25(10) | 32(9) | | |
| 8(7) | 8(8) | 8(9) | 8(10) | 14(10) | 17(9) | 17(10) | 26(7) | 26(8) | 26(9) | 26(10) | 32(10) | 35(9) | 35(10) |
| 9(7) | 9(8) | 9(9) | 9(10) | 15(7) | 18(7) | 18(8) | 27(7) | 27(8) | 27(9) | 27(10) | 33(7) | 36(7) | 36(8) |
| 10(7) | 10(8) | 10(9) | 10(10) | 15(8) | 18(9) | 18(10) | 28(7) | 28(8) | 28(9) | 28(10) | 33(8) | 36(9) | 36(10) |
| 11(7) | 11(8) | 11(9) | 11(10) | 15(9) | | | 29(7) | 29(8) | 29(9) | 29(10) | 33(9) | | |
| 12(7) | 12(8) | 12(9) | 12(10) | 15(10) | | | 30(7) | 30(8) | 30(9) | 30(10) | 33(10) | | |

FIG. 5

| 1(7) | 4(7) | 7(7) | 10(7) | 13(7) | | | 19(7) | 22(7) | 25(7) | 28(7) | 31(7) | | |
|---|---|---|---|---|---|---|---|---|---|---|---|---|---|
| 1(8) | 4(8) | 7(8) | 10(8) | 13(8) | | | 19(8) | 22(8) | 25(8) | 28(8) | 31(8) | | |
| 1(9) | 4(9) | 7(9) | 10(9) | 13(9) | 16(7) | 16(9) | 19(9) | 22(9) | 25(9) | 28(9) | 31(9) | 34(7) | 34(9) |
| 1(10) | 4(10) | 7(10) | 10(10) | 13(10) | 16(8) | 16(10) | 19(10) | 22(10) | 25(10) | 28(10) | 31(10) | 34(8) | 34(10) |
| 2(7) | 5(7) | 8(7) | 11(7) | 14(7) | 17(7) | 17(9) | 20(7) | 23(7) | 26(7) | 29(7) | 32(7) | 35(7) | 35(9) |
| 2(8) | 5(8) | 8(8) | 11(8) | 14(8) | | | 20(8) | 23(8) | 26(8) | 29(8) | 32(8) | | |
| 2(9) | 5(9) | 8(9) | 11(9) | 14(9) | | | 20(9) | 23(9) | 26(9) | 29(9) | 32(9) | | |
| 2(10) | 5(10) | 8(10) | 11(10) | 14(10) | 17(8) | 17(10) | 20(10) | 23(10) | 26(10) | 29(10) | 32(10) | 35(8) | 35(10) |
| 3(7) | 6(7) | 9(7) | 12(7) | 15(7) | 18(7) | 18(9) | 21(7) | 24(7) | 27(7) | 30(7) | 33(7) | 36(7) | 36(9) |
| 3(8) | 6(8) | 9(8) | 12(8) | 15(8) | 18(8) | 18(10) | 21(8) | 24(8) | 27(8) | 30(8) | 33(8) | 36(8) | 36(10) |
| 3(9) | 6(9) | 9(9) | 12(9) | 15(9) | | | 21(9) | 24(9) | 27(9) | 30(9) | 33(9) | | |
| 3(10) | 6(10) | 9(10) | 12(10) | 15(10) | | | 21(10) | 24(10) | 27(10) | 30(10) | 33(10) | | |

FIG. 6

| 1(7) | 1(8) | 7(7) | 7(8) | 13(7) | ▓ | ▓ | 13(8) | 22(7) | 22(8) | 28(7) | 28(8) | ▓ | ▓ |
|---|---|---|---|---|---|---|---|---|---|---|---|---|---|
| 1(9) | 1(10) | 7(9) | 7(10) | 13(9) | ▓ | ▓ | 13(10) | 22(9) | 22(10) | 28(9) | 28(10) | ▓ | ▓ |
| 2(7) | 2(8) | 8(7) | 8(8) | 14(7) | 14(8) | 15(7) | 15(8) | 23(7) | 23(8) | 29(7) | 29(8) | 34(7) | 34(8) |
| 2(9) | 2(10) | 8(9) | 8(10) | 14(9) | 14(10) | 15(9) | 15(10) | 23(9) | 23(10) | 29(9) | 29(10) | 34(9) | 34(10) |
| 3(7) | 3(8) | 9(7) | 9(8) | 16(7) | 17(7) | 17(8) | 18(7) | 24(7) | 24(8) | 30(7) | 30(8) | 35(7) | 35(8) |
| 3(9) | 3(10) | 9(9) | 9(10) | 16(8) | ▓ | ▓ | 18(8) | 24(9) | 24(10) | 30(9) | 30(10) | ▓ | ▓ |
| 4(7) | 4(8) | 10(7) | 10(8) | 16(9) | ▓ | ▓ | 18(9) | 25(7) | 25(8) | 31(7) | 31(8) | ▓ | ▓ |
| 4(9) | 4(10) | 10(9) | 10(10) | 16(10) | 17(9) | 17(10) | 18(10) | 25(9) | 25(10) | 31(9) | 31(10) | 35(9) | 35(10) |
| 5(7) | 5(8) | 11(7) | 11(8) | 19(7) | 19(8) | 20(7) | 20(8) | 26(7) | 26(8) | 32(7) | 32(8) | 36(7) | 36(8) |
| 5(9) | 5(10) | 11(9) | 11(10) | 19(9) | 19(10) | 20(9) | 20(10) | 26(9) | 26(10) | 32(9) | 32(10) | 36(9) | 36(10) |
| 6(7) | 6(8) | 12(7) | 12(8) | 21(7) | ▓ | ▓ | 21(8) | 27(7) | 27(8) | 33(7) | 33(8) | ▓ | ▓ |
| 6(9) | 6(10) | 12(9) | 12(10) | 21(9) | ▓ | ▓ | 21(10) | 27(9) | 27(10) | 33(9) | 33(10) | ▓ | ▓ |

FIG. 7

| 1 | 13 | 9 | 5 | 1 | ▓ | ▓ | 9 | 5 | 1 | 13 | 9 | ▓ | ▓ |
|---|---|---|---|---|---|---|---|---|---|---|---|---|---|
| 2 | 14 | 10 | 6 | 2 | ▓ | ▓ | 10 | 6 | 2 | 14 | 10 | ▓ | ▓ |
| 3 | 15 | 11 | 7 | 3 | 13 | 15 | 11 | 7 | 3 | 15 | 11 | 5 | 7 |
| 4 | 16 | 12 | 8 | 4 | 14 | 16 | 12 | 8 | 4 | 16 | 12 | 6 | 8 |
| 5 | 1 | 13 | 9 | 5 | 1 | 3 | 13 | 9 | 5 | 1 | 13 | 9 | 11 |
| 6 | 2 | 14 | 10 | 6 | ▓ | ▓ | 14 | 10 | 6 | 2 | 14 | ▓ | ▓ |
| 7 | 3 | 15 | 11 | 7 | ▓ | ▓ | 15 | 11 | 7 | 3 | 15 | ▓ | ▓ |
| 8 | 4 | 16 | 12 | 8 | 2 | 4 | 16 | 12 | 8 | 4 | 16 | 10 | 12 |
| 9 | 5 | 1 | 13 | 9 | 5 | 7 | 1 | 13 | 9 | 5 | 1 | 13 | 15 |
| 10 | 6 | 2 | 14 | 10 | 6 | 8 | 2 | 14 | 10 | 6 | 2 | 14 | 16 |
| 11 | 7 | 3 | 15 | 11 | ▓ | ▓ | 3 | 15 | 11 | 7 | 3 | ▓ | ▓ |
| 12 | 8 | 4 | 16 | 12 | ▓ | ▓ | 4 | 16 | 12 | 8 | 4 | ▓ | ▓ |

FIG. 8

| 1(7) | 4(7) | 7(7) | 10(7) | 13(7) | | | 19(7) | 22(7) | 25(7) | 28(7) | 31(7) | | |
|---|---|---|---|---|---|---|---|---|---|---|---|---|---|
| 1(8) | 4(8) | 7(8) | 10(8) | 13(8) | | | 19(8) | 22(8) | 25(8) | 28(8) | 31(8) | | |
| 1(9) | 4(9) | 7(9) | 10(9) | 13(9) | 16(7) | 16(9) | 19(9) | 22(9) | 25(9) | 28(9) | 31(9) | 34(7) | 34(9) |
| 1(10) | 4(10) | 7(10) | 10(10) | 13(10) | 16(8) | 16(10) | 19(10) | 22(10) | 25(10) | 28(10) | 31(10) | 34(8) | 34(10) |
| 2(7) | 5(7) | 8(7) | 11(7) | 14(7) | 17(7) | 17(8) | 20(7) | 23(7) | 26(7) | 29(7) | 32(7) | 35(7) | 35(8) |
| 2(8) | 5(8) | 8(8) | 11(8) | 14(8) | | | 20(8) | 23(8) | 26(8) | 29(8) | 32(8) | | |
| 2(9) | 5(9) | 8(9) | 11(9) | 14(9) | | | 20(9) | 23(9) | 26(9) | 29(9) | 32(9) | | |
| 2(10) | 5(10) | 8(10) | 11(10) | 14(10) | 17(9) | 17(10) | 20(10) | 23(10) | 26(10) | 29(10) | 32(10) | 35(9) | 35(10) |
| 3(7) | 6(7) | 9(7) | 12(7) | 15(7) | 18(7) | 18(9) | 21(7) | 24(7) | 27(7) | 30(7) | 33(7) | 36(7) | 36(9) |
| 3(8) | 6(8) | 9(8) | 12(8) | 15(8) | 18(8) | 18(10) | 21(8) | 24(8) | 27(8) | 30(8) | 33(8) | 36(8) | 36(10) |
| 3(9) | 6(9) | 9(9) | 12(9) | 15(9) | | | 21(9) | 24(9) | 27(9) | 30(9) | 33(9) | | |
| 3(10) | 6(10) | 9(10) | 12(10) | 15(10) | | | 21(10) | 24(10) | 27(10) | 30(10) | 33(10) | | |

FIG. 11

| 1(7) | 4(7) | 7(7) | 10(7) | 13(7) | | | 19(7) | 22(7) | 25(7) | 28(7) | 31(7) | | |
|---|---|---|---|---|---|---|---|---|---|---|---|---|---|
| 1(8) | 4(8) | 7(8) | 10(8) | 13(8) | | | 19(8) | 22(8) | 25(8) | 28(8) | 31(8) | | |
| 1(9) | 4(9) | 7(9) | 10(9) | 13(9) | 16(7) | 16(9) | 19(9) | 22(9) | 25(9) | 28(9) | 31(9) | 34(7) | 34(9) |
| 1(10) | 4(10) | 7(10) | 10(10) | 13(10) | 16(8) | 16(10) | 19(10) | 22(10) | 25(10) | 28(10) | 31(10) | 34(8) | 34(10) |
| 2(7) | 5(7) | 8(7) | 11(7) | 14(7) | 17(7) | 17(8) | 20(7) | 23(7) | 26(7) | 29(7) | 32(7) | 35(7) | 35(8) |
| 2(8) | 5(8) | 8(8) | 11(8) | 14(8) | | | 20(8) | 23(8) | 26(8) | 29(8) | 32(8) | | |
| 2(9) | 5(9) | 8(9) | 11(9) | 14(9) | | | 20(9) | 23(9) | 26(9) | 29(9) | 32(9) | | |
| 2(10) | 5(10) | 8(10) | 11(10) | 14(10) | 17(10) | 17(9) | 20(10) | 23(10) | 26(10) | 29(10) | 32(10) | 35(10) | 35(9) |
| 3(7) | 6(7) | 9(7) | 12(7) | 15(7) | 18(7) | 18(9) | 21(7) | 24(7) | 27(7) | 30(7) | 33(7) | 36(7) | 36(9) |
| 3(8) | 6(8) | 9(8) | 12(8) | 15(8) | 18(8) | 18(10) | 21(8) | 24(8) | 27(8) | 30(8) | 33(8) | 36(8) | 36(10) |
| 3(9) | 6(9) | 9(9) | 12(9) | 15(9) | | | 21(9) | 24(9) | 27(9) | 30(9) | 33(9) | | |
| 3(10) | 6(10) | 9(10) | 12(10) | 15(10) | | | 21(10) | 24(10) | 27(10) | 30(10) | 33(10) | | |

FIG. 12

| 1 | 13 | 9 | 5 | 1 |    |    | 9 | 5 | 1 | 13 | 9 |    |    |
|---|----|---|---|---|----|----|---|---|---|----|---|----|----|
| 2 | 14 | 10 | 6 | 2 |    |    | 10 | 6 | 2 | 14 | 10 |    |    |
| 3 | 15 | 11 | 7 | 3 | 13 | 15 | 11 | 7 | 3 | 15 | 11 | 5 | 7 |
| 4 | 16 | 12 | 8 | 4 | 14 | 16 | 12 | 8 | 4 | 16 | 12 | 6 | 8 |
| 5 | 1 | 13 | 9 | 5 | 1 | 2 | 13 | 9 | 5 | 1 | 13 | 9 | 10 |
| 6 | 2 | 14 | 10 | 6 |    |    | 14 | 10 | 6 | 2 | 14 |    |    |
| 7 | 3 | 15 | 11 | 7 |    |    | 15 | 11 | 7 | 3 | 15 |    |    |
| 8 | 4 | 16 | 12 | 8 | 3 | 4 | 16 | 12 | 8 | 4 | 16 | 11 | 12 |
| 9 | 5 | 1 | 13 | 9 | 5 | 7 | 1 | 13 | 9 | 5 | 1 | 13 | 15 |
| 10 | 6 | 2 | 14 | 10 | 6 | 8 | 2 | 14 | 10 | 6 | 2 | 14 | 16 |
| 11 | 7 | 3 | 15 | 11 |    |    | 3 | 15 | 11 | 7 | 3 |    |    |
| 12 | 8 | 4 | 16 | 12 |    |    | 4 | 16 | 12 | 8 | 4 |    |    |

FIG. 13

| 1 | 13 | 9 | 5 | 1 |    |    | 9 | 5 | 1 | 13 | 9 |    |    |
|---|----|---|---|---|----|----|---|---|---|----|---|----|----|
| 2 | 14 | 10 | 6 | 2 |    |    | 10 | 6 | 2 | 14 | 10 |    |    |
| 3 | 15 | 11 | 7 | 3 | 13 | 15 | 11 | 7 | 3 | 15 | 11 | 5 | 7 |
| 4 | 16 | 12 | 8 | 4 | 14 | 16 | 12 | 8 | 4 | 16 | 12 | 6 | 8 |
| 5 | 1 | 13 | 9 | 5 | 1 | 2 | 13 | 9 | 5 | 1 | 13 | 9 | 10 |
| 6 | 2 | 14 | 10 | 6 |    |    | 14 | 10 | 6 | 2 | 14 |    |    |
| 7 | 3 | 15 | 11 | 7 |    |    | 15 | 11 | 7 | 3 | 15 |    |    |
| 8 | 4 | 16 | 12 | 8 | 4 | 3 | 16 | 12 | 8 | 4 | 16 | 12 | 11 |
| 9 | 5 | 1 | 13 | 9 | 5 | 7 | 1 | 13 | 9 | 5 | 1 | 13 | 15 |
| 10 | 6 | 2 | 14 | 10 | 6 | 8 | 2 | 14 | 10 | 6 | 2 | 14 | 16 |
| 11 | 7 | 3 | 15 | 11 |    |    | 3 | 15 | 11 | 7 | 3 |    |    |
| 12 | 8 | 4 | 16 | 12 |    |    | 4 | 16 | 12 | 8 | 4 |    |    |

FIG. 14

CONTROL CHANNEL TRANSMISSION METHOD AND APPARATUS TO IMPLEMENT TRANSMISSION OF EPDCCHS THROUGH AN EREG IN A UNIT PHYSICAL RESOURCE BLOCK

CROSS-REFERENCE TO RELATED APPLICATIONS

This application is a continuation of International Application No. PCT/CN2012/081545, filed on Sep. 18, 2012, which claims priority to International Application No. PCT/CN2012/079198, filed on Jul. 26, 2012, both of which are incorporated by reference in their entireties.

TECHNICAL FIELD

This application relates to communications technologies, and in particular embodiments, to a control channel transmission method and apparatus.

BACKGROUND

In a wireless communication system such as a long term evolution (LTE) system or a long term evolution advanced (LTE-Advanced) system, a physical downlink control channel (PDCCH) transmitted based on a precoding mode, that is, an enhanced physical downlink control channel (ePDCCH), is introduced. The ePDCCH enables a user equipment (UE) to perform demodulation based on a specific reference signal, that is, a demodulation reference signal (DMRS). The ePDCCH is transmitted in an area where a downlink data channel is transmitted in a subframe, and may implement frequency division with a physical downlink shared channel (PDSCH). A base station may send the ePDCCH on a unit physical resource block (PRB) with a good channel condition according to a channel status reported by a terminal. In a subframe, physical resource blocks of two timeslots may be referred to as a resource block pair (RB pair), which is generally referred to as a unit physical resource block.

However, in the prior art, how to transmit some control channels, for example, ePDCCHs, through an enhanced resource element group (eREG) in a unit physical resource block is not provided.

SUMMARY OF THE INVENTION

This application provides a control channel transmission method and apparatus in various aspects, so as to implement transmission of some control channels, for example, ePDCCHs, through an eREG in a unit physical resource block.

In one aspect, this application provides a control channel transmission method. At least one unit physical resource block is determined for transmitting a control channel. Resource elements included in each unit physical resource block are divided into M groups. Each group includes N resource elements. The N resource elements correspond to N positions. M is an integer greater than or equal to 2 and N is an integer greater than or equal to 1. According to an aggregation level of the control channel and eREGs included in each eCCE, eREG information of the control channel to be mapped to each unit physical resource block is determined. The control channel is mapped to an eREG according to the eREG information. The eREG corresponds to the eREG information and is among a designated number of eREGs in each unit physical resource block. Each eREG among the designated number of the eREGs is formed by a designated number of resource elements. The designated number of the resource elements are selected from corresponding resource elements at an $S^{th}$ position in each group S is a positive integer smaller than or equal to N, and transmitting the control channel on the mapped eREG.

In a first possible implementation manner, the resource elements included in each unit physical resource block include all resource elements in each unit physical resource block, or resource elements other than a resource element to which a reference signal and/or another control channel is mapped among all resource elements in each unit physical resource block.

With reference to the first possible implementation manner, in a second possible implementation manner, before the mapping, according to the determined eREG, the control channel to the determined eREG among the designated number of the eREGs in each unit physical resource block, the method further includes dividing the resource elements included in each unit physical resource block into at least two groups, mapping the N resource elements included in each group to the N positions, and selecting a designated number of resource elements from resource elements corresponding, in all groups, to the $S^{th}$ position among the N positions, to form each eREG among the designated number of the eREGs.

With reference to the first or the second possible implementation manner, in a third possible implementation manner, the position corresponds to a DMRS port.

In another aspect, this application provides a control channel transmission apparatus. A determining unit is configured to determine at least one unit physical resource block for transmitting a control channel. Resource elements included in each unit physical resource block are divided into M groups. Each group includes N resource elements. The N resource elements correspond to N positions. M is an integer greater than or equal to 2 and N is an integer greater than or equal to 1. The determining unit is also configured to determine, according to an aggregation level of the control channel and eREGs included in each eCCE, eREG information of the control channel to be mapped to each unit physical resource block and to transmit the eREG information to a mapping unit. The mapping unit is configured to map, according to the eREG information, the control channel to an eREG, which corresponds to the eREG information, among a designated number of eREGs in each unit physical resource block. Each eREG among the designated number of the eREGs is formed by a designated number of resource elements. The designated number of the resource elements are selected from corresponding resource elements at an $S^{th}$ position in each group, and S is a positive integer smaller than or equal to N. A transmitting unit is configured to transmit the control channel on the eREG mapped by the mapping unit.

In a first possible implementation manner, the resource elements included in each unit physical resource block include all resource elements in each unit physical resource block, or resource elements other than a resource element to which a reference signal and/or another control channel is mapped among all resource elements in each unit physical resource block.

With reference to the first possible implementation manner, in a second possible implementation manner, the mapping unit is further configured to divide the resource elements included in each unit physical resource block into at least two groups, map the N resource elements included in each group to the N positions, and select a designated number of resource elements from resource elements corresponding, in all groups, to the $S^{th}$ position among the N positions, to form each eREG among the designated number of the eREGs.

With reference to the first or the second possible implementation manner, in a third possible implementation manner, the position corresponds to a DMRS port.

In another aspect, this application provides a control channel transmission apparatus. A processor is configured to determine at least one unit physical resource block for transmitting a control channel. Resource elements included in each unit physical resource block are divided into M groups. Each group includes N resource elements. The N resource elements correspond to N positions. M is an integer greater than or equal to 2 and N is an integer greater than or equal to 1. The processor is also configured to determine, according to an aggregation level of the control channel and eREGs included in each eCCE, eREG information of the control channel to be mapped to each unit physical resource block. The processor is further configured to map, according to the eREG information, the control channel to an eREG, which corresponds to the eREG information, among a designated number of eREGs in each unit physical resource block. Each eREG among the designated number of the eREGs is formed by a designated number of resource elements. The designated number of the resource elements are selected from corresponding resource elements at an $S^{th}$ position in each group, and S is a positive integer smaller than or equal to N. A transmitter is configured to transmit the control channel at a position of the eREG in each unit physical resource block. The eREG is mapped by the processor receiver, alternatively, a configured to receive the control channel that is transmitted at a position of the eREG in each unit physical resource block. In this case, eREG is mapped by the processor.

In a first possible implementation manner, the resource elements included in each unit physical resource block include all resource elements in each unit physical resource block, or resource elements other than a resource element to which a reference signal and/or another control channel is mapped among all resource elements in each unit physical resource block.

With reference to the first possible implementation manner, in a second possible implementation manner, the processor is further configured to divide the resource elements included in each unit physical resource block into at least two groups, map the N resource elements included in each group to the N positions, and select a designated number of resource elements from resource elements corresponding, in all groups, to the $S^{th}$ position among the N positions, to form each eREG among the designated number of the eREGs.

With reference to the first or the second possible implementation manner, in a third possible implementation manner, the position corresponds to a DMRS port.

It can be known from the foregoing technical solutions that, in the embodiments of this application, the control channel is mapped to the eREG, which corresponds to the eREG information, among the designated number of the eREGs in each unit physical resource block, where each eREG among the designated number of the eREGs is formed by the designated number of the resource elements, the designated number of the resource elements are selected from corresponding resource elements at the $S^{th}$ position in each group, and S is a positive integer smaller than or equal to N, so that the control channel can be transmitted on the mapped eREG, thereby implementing transmission of some control channels, for example, ePDCCHs, through an eREG in a unit physical resource block.

BRIEF DESCRIPTION OF THE DRAWINGS

To describe the technical solutions in the embodiments of this application more clearly, the accompanying drawings required for describing the embodiments are introduced briefly in the following. Apparently, the accompanying drawings in the following description show only some embodiments of this application, and persons of ordinary skill in the art may also derive other drawings from these accompanying drawings without creative efforts.

FIG. 1 is a schematic flow chart of a control channel transmission method according to an embodiment of this application;

FIG. 2 to FIG. 4 are schematic grouping diagrams of resource elements in a unit physical resource block in the embodiment shown in FIG. 1;

FIG. 5 to FIG. 7 are schematic diagrams of mapping of resource elements in each group shown in FIG. 2 to FIG. 4 to a DMRS port 7, a DMRS port 8, a DMRS port 9, and a DMRS port 10;

FIG. 8 is a schematic diagram of positions of 16 eREGs obtained through each group shown in FIG. 6 in a unit physical resource block;

FIG. 11 and FIG. 12 are schematic diagrams of mapping of resource elements in each group shown in FIG. 3 to the DMRS port 7, the DMRS port 8, the DMRS port 9, and the DMRS port 10;

FIG. 13 is a schematic diagram of positions of 16 eREGs obtained through each group shown in FIG. 11 in a unit physical resource block; and FIG. 14 is a schematic diagram of positions of 16 eREGs obtained through each group shown in FIG. 12 in a unit physical resource block.

DETAILED DESCRIPTION OF ILLUSTRATIVE EMBODIMENTS

Figures 1, 2:
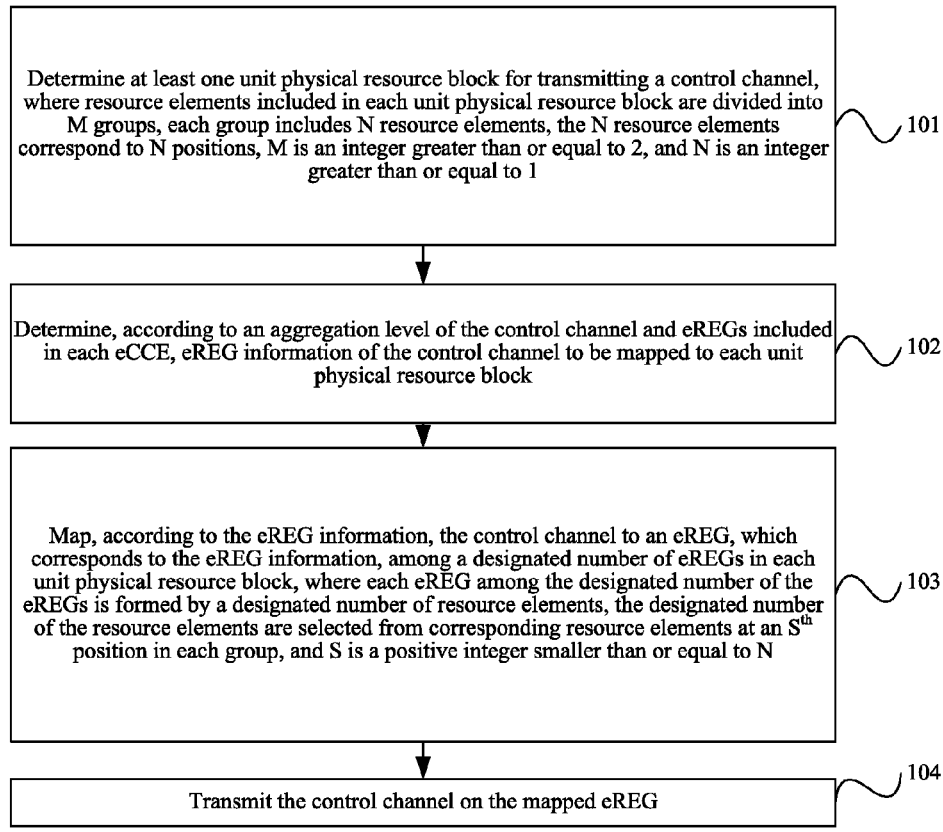

In order to make the objectives, technical solutions, and advantages of this application more comprehensible, the technical solutions in the embodiments of this application are clearly described in the following with reference to the accompanying drawings in the embodiments of this application. Apparently, the embodiments to be described are only a part rather than all of the embodiments of this application. All other embodiments obtained by persons of ordinary skill in the art based on the embodiments of this application without creative efforts shall fall within the protection scope of this application.

In addition, the term "and/or" in this specification describes only association between related objects, and indicates that three relationships may exist. For example, A and/or B may indicate that the following three cases: A exists separately, both A and B exist, and B exists separately. In addition, the symbol "/" in this specification generally indicates that associated objects are in an "or" relationship.

In a wireless communication system such as a long term evolution (LTE) system or a long term evolution advanced (LTE-Advanced) system, an orthogonal frequency division multiple access (OFDMA) mode is generally adopted as a downlink multiple access mode. Downlink resources of a system are classified into orthogonal frequency division multiplexing (OFDM) symbols from the aspect of time, and classified into sub-carriers from the aspect of frequency.

According to the LTE Release 8/9/10 standard, one normal downlink subframe includes two timeslots (slot), and each timeslot has 7 or 6 OFDM symbols, so that one normal downlink subframe includes 14 OFDM symbols or 12 OFDM symbols in total. The LTE Release 8/9/10 standard further defines the size of a resource block (RB), namely, one resource block includes 12 sub-carriers in a frequency domain and has half of a time length of a subframe (that is, one timeslot) in a time domain, that is, includes 7 or 6 OFDM symbols. In one subframe, a pair of resource blocks of two timeslots is referred to as a resource block pair (RB pair). In actual transmission, a resource block pair used for physical resources is also called a physical resource block pair (PRB pair), and is generally referred to as a unit physical resource block. Therefore, a PRB, a PRB pair, a physical resource block, and a physical resource block pair described in the following all refer to a PRB pair.

Data borne in a subframe is arranged for mapping over physical channels that are divided from physical time-frequency resources of the subframe. The physical channels may be substantially classified into two types: a control channel and a service channel. Correspondingly, data borne on the control channel may be referred to as control data (which may be generally referred to as control information), and data borne on the service channel may be referred to as service data (which may be generally referred to as data). A basic objective of sending a subframe is to transmit service data, and the control channel is used to assist service data transmission.

In the LTE system, one complete physical downlink control channel (PDCCH) may be mapped to one or more control channel elements (CCE). According to the LTE Release 8/9/10, one PDCCH may be mapped to 1, 2, 4 or 8 CCEs, that is, formed by 1, 2, 4 or 8 CCEs and corresponding to an aggregation level 1, 2, 4 or 8, respectively.

With the introduction of technologies such as multiple input multiple output (Multiple Input Multiple Output, MIMO) and coordinated multiple points (CoMP), a physical downlink control channel (PDCCH) transmitted based on a precoding mode, that is, an enhanced physical downlink control channel (ePDCCH), is introduced. The ePDCCH enables a user equipment (UE) to perform demodulation based on a specific reference signal, that is, a demodulation reference signal (DMRS). Each ePDCCH may still be mapped to k logic elements similar to CCEs (the logic elements are herein defined as enhanced control channel elements (eCCE)), and the UE needs to perform blind detection at a terminal side. Following a definition of an aggregation level of a PDCCH, an ePDCCH with an aggregation level L (L=1, 2, 4 or 8) may be mapped to L eCCEs, that is, formed by L eCCEs. One eCCE is formed by one or more eREGs.

FIG. 1 is a schematic flow chart of a control channel transmission method according to an embodiment of this application, as shown in FIG. 1. The method includes the following steps.

101: Determine at least one unit physical resource block for transmitting a control channel. Resource elements included in each unit physical resource block are divided into M groups. Each group includes N resource elements. The N resource elements correspond to N positions. M is an integer greater than or equal to 2 and N is an integer greater than or equal to 1.

102: Determine, according to an aggregation level of the control channel and eREGs included in each eCCE, eREG information of the control channel to be mapped to each unit physical resource block.

103: Map, according to the eREG information, the control channel to an eREG, which corresponds to the eREG information, among a designated number of eREGs in each unit physical resource block. Each eREG among the designated number of the eREGs is formed by a designated number of resource elements. The designated number of the resource elements are selected from corresponding resource elements at an $S^{th}$ position in each group. S is a positive integer smaller than or equal to N.

104: Transmit the control channel on the mapped eREG.

The control channel may be specifically an enhanced physical downlink control channel (ePDCCH).

Optionally, in a possible implementation manner of this embodiment, in 102, specifically, eCCE information of the control channel to be mapped to each unit physical resource block may be determined according to the aggregation level of the control channel; and the eREG information of the control channel to be mapped to each unit physical resource block may be determined according to eREGs included in each eCCE corresponding to the eCCE information.

Specifically, in 102, the determined eREG information may include the number of eREGs and an eREG identifier.

Optionally, in a possible implementation manner of this embodiment, the resource elements included in each unit physical resource block may include all resource elements in each unit physical resource block.

Optionally, in a possible implementation manner of this embodiment, the resource elements included in each unit physical resource block may include resource elements other than a resource element to which a reference signal and/or another control channel is mapped among all resource elements in each unit physical resource block.

The reference signal may include, but is not limited to, at least one of a common reference signal (CRS), a DMRS, a channel status information reference signal (CSI-RS), and a positioning reference signal (PRS).

The another control channel may be specifically at least one of a physical downlink control channel (PDCCH), a physical control format indicator channel (PCFICH), and a physical hybrid automatic repeat request indicator channel (PHICH).

Optionally, in a possible implementation manner of this embodiment, before 103, the resource elements included in each unit physical resource block may further be divided into at least two groups; then the N resource elements included in each group are mapped to the N positions; and then a designated number of resource elements are selected from resource elements corresponding, in all groups, to the $S^{th}$ position among the N positions, to form each eREG among the designated number of the eREGs. Specifically, a row-in column-out interleaver with N rows and M columns may be adopted, where N is the total number of the designated number of resource elements and M is the total number of a designated number of positions; and resource elements mapped to the same position in all the groups are used as inputs of the interleaver, and each column output by the interleaver may correspond to one eREG.

Optionally, in a possible implementation manner of this embodiment, the position may further correspond to a DMRS port.

That one unit physical resource block (including 168 resource elements in total) includes 12 sub-carriers in a frequency domain and 14 OFDM symbols in a time domain is taken as an example in the following. The positions correspond to a DMRS port 7, a DMRS port 8, a DMRS port 9, and a DMRS port 10, where 7, 8, 9, and 10 are all serial numbers of DMRS ports.

As shown in FIG. 2 to FIG. 4, shadowed areas marked by horizontal lines represent resource elements mapped by a DMRS. FIG. 2 to FIG. 4 are schematic grouping diagrams where in a unit physical resource block formed by 168 resource elements (including 24 resource elements mapped by the DMRS), after the 24 resource elements mapped by the DMRS are removed, the remaining resource elements are divided into 36 groups (serial numbers of which are 1 to 36). In the diagrams, each square represents one resource element, the vertical direction represents frequency domain resources, the horizontal direction represents time domain resources, and a serial number X in a square represents a serial number of a group.

As shown in FIG. 5 to FIG. 7, shadowed areas marked by horizontal lines represent resource elements mapped by a DMRS. FIG. 5 to FIG. 7 are schematic diagrams of mapping of resource elements in each group shown in FIG. 2 to FIG. 4 to a DMRS port 7, a DMRS port 8, a DMRS port 9, and a DMRS port 10. Each square represents one resource element, the vertical direction represents frequency domain resources, the horizontal direction represents time domain resources, and a serial number X(Y) in a square represents a serial number X of a group and a serial number Y of a DMRS port.

It should be noted that, FIG. 5 to FIG. 7 show only some examples of mapping resource elements in each group to the DMRS port 7, the DMRS port 8, the DMRS port 9, and the DMRS port 10. For example, a mapping rule is {7, 8, 9, 10}, and another mapping rule such as {7, 9, 8, 10} is also applicable to this embodiment. Specific examples are as shown in FIG. 11 to FIG. 12, which is not limited in this embodiment.

It should be noted that, the technical solution provided in this embodiment may also be applied to another number of DMRS ports, for example, DMRS ports {7, 9} or DMRS ports {8, 10}, and in this case, a mapping rule may be {7, 9, 7, 9} or {8, 10, 8, 10}.

Taking the grouping shown in FIG. 3 as an example, if it is assumed that each unit physical resource block has 16 eREGs and each eREG is formed by 9 resource elements, a row-in column-out interleaver with 9 rows and 4 columns may be specifically adopted, and resource elements mapped to the same position in 36 groups shown in FIG. 6 are used as inputs of the interleaver, so that each column output by the interleaver corresponds to one eREG, thereby obtaining a schematic diagram of positions of 16 eREGs in a unit physical resource block. As shown in FIG. 8, shadowed areas marked by horizontal lines represent resource elements mapped by a DMRS. In FIG. 8, each square represents one resource element, the vertical direction represents frequency domain resources, the horizontal direction represents time domain resources, and a serial number Z in a square represents a serial number of each eREG in a designated number of eREGs.

Still taking the grouping shown in FIG. 3 as an example, if it is assumed that each unit physical resource block has 16 eREGs and each eREG is formed by 9 resource elements, a row-in column-out interleaver with 9 rows and 4 columns may be specifically adopted, and resource elements mapped to the same position in 36 groups shown in FIG. 11 are used as inputs of the interleaver, so that each column output by the interleaver corresponds to one eREG, thereby obtaining a schematic diagram of positions of 16 eREGs in a unit physical resource block. As shown in FIG. 13, shadowed areas marked by horizontal lines represent resource elements mapped by a DMRS. In FIG. 13, each square represents one resource element, the vertical direction represents frequency domain resources, the horizontal direction represents time domain resources, and a serial number Z in a square represents a serial number of each eREG in a designated number of eREGs.

Still taking the grouping shown in FIG. 3 as an example, if it is assumed that each unit physical resource block has 16 eREGs and each eREG is formed by 9 resource elements, a row-in column-out interleaver with 9 rows and 4 columns may be specifically adopted, and resource elements mapped to the same position in 36 groups shown in FIG. 12 are used as inputs of the interleaver, so that each column output by the interleaver corresponds to one eREG, thereby obtaining a schematic diagram of positions of 16 eREGs in a unit physical resource block. As shown in FIG. 14, shadowed areas marked by horizontal lines represent resource elements mapped by a DMRS. In FIG. 14, each square represents one resource element, the vertical direction represents frequency domain resources, the horizontal direction represents time domain resources, and a serial number Z in a square represents each eREG in a serial number of a designated number of eREGs.

If it is assumed that each unit physical resource block has 8 eREGs and each eREG is formed by 18 resource elements, the technical solution provided in this embodiment may be adopted to obtain positions of a designated number of eREGs in a unit physical resource block, or every two eREGs shown in FIG. 8 may be directly integrated into one eREG.

In this embodiment, a control channel is mapped to an eREG, which corresponds to determined eREG information, among a designated number of eREGs in each unit physical resource block, where each eREG among the designated number of the eREGs is formed by a designated number of resource elements, the designated number of the resource elements are selected from corresponding resource elements at an $S^{th}$ position in each group, and S is a positive integer smaller than or equal to N, so that the control channel can be transmitted on the mapped eREG, thereby implementing transmission of some control channels, for example, ePDCCHs, through an eREG in a unit physical resource block.

It should be noted that, for the foregoing method embodiments, for simple description, the methods are described as a series of action combinations, but persons skilled in the art should know that, this application is not limited by a described action sequence, because according to this application, some steps may be performed in another sequence or performed simultaneously. Next, persons skilled in the art should also know that, the embodiments described in the specification are exemplary embodiments, and the involved actions and modules are not indispensable for this application.

In the foregoing embodiments, descriptions of the embodiments have different emphases, and for parts that are not described in detail in a certain embodiment, reference may be made to the relevant description of other embodiments.

Figure 9:
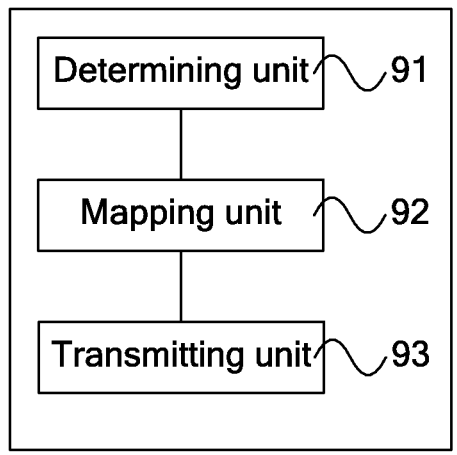
FIG. 9 is a schematic structural diagram of a control channel transmission apparatus according to another embodiment of this application.

FIG. 9 is a schematic structural diagram of a control channel transmission apparatus according to another embodiment of this application. As shown in FIG. 9, the control channel transmission apparatus in this embodiment may include a determining unit 91, a mapping unit 92, and a transmitting unit 93. The determining unit 91 is configured to determine at least one unit physical resource block for transmitting a control channel. Resource elements included in each unit physical resource block are divided into M groups. Each group includes N resource elements. The N resource elements correspond to N positions. M is an integer greater than or equal to 2 and N is an integer greater than or equal to 1. The determining unit 91 is also configured to determine, according to an aggregation level of the control channel and eREGs included in each eCCE, eREG information of the control channel to be mapped to each unit physical resource block, and transmit the eREG information to the mapping unit 92.

The mapping unit 92 is configured to map, according to the eREG information, the control channel to an eREG, which corresponds to the eREG information, among a designated number of eREGs in each unit physical resource block. Each eREG among the designated number of the eREGs is formed by a designated number of resource elements. The designated number of the resource elements are selected from corresponding resource elements at an $S^{th}$ position in each group. S is a positive integer smaller than or equal to N. The transmitting unit 93 is configured to transmit the control channel on the eREG mapped by the mapping unit 92.

The control channel may be specifically an enhanced physical downlink control channel (ePDCCH).

Optionally, in a possible implementation manner of this embodiment, the determining unit 91 may specifically determine, according to the aggregation level of the control channel, eCCE information of the control channel to be mapped to each unit physical resource block; and determine, according to eREGs included in each eCCE corresponding to the eCCE information, the eREG information of the control channel to be mapped to each unit physical resource block.

Specifically, the eREG information determined by the determining unit 91 may include the number of eREGs and an eREG identifier.

Optionally, in a possible implementation manner of this embodiment, the resource elements included in each unit physical resource block may include all resource elements in each unit physical resource block.

Optionally, in a possible implementation manner of this embodiment, the resource elements included in each unit physical resource block may include resource elements other than a resource element to which a reference signal and/or another control channel is mapped among all resource elements in each unit physical resource block.

The reference signal may include, but is not limited to, at least one of a common reference signal (CRS), a DMRS, a channel status information reference signal (CSI-RS), and a positioning reference signal (PRS).

The other control channel may be specifically at least one of a physical downlink control channel (PDCCH), a physical control format indicator channel (PCFICH), and a physical hybrid automatic repeat request indicator channel (PHICH).

Optionally, in a possible implementation manner of this embodiment, the mapping unit 92 may further divide the resource elements included in each unit physical resource block into at least two groups and then map the N resource elements included in each group to the N positions; the mapping unit 92 may then select a designated number of resource elements from resource elements corresponding, in all groups, to the $S^{th}$ position among the N positions, to form each eREG among the designated number of the eREGs. Specifically, a row-in column-out interleaver with N rows and M columns may be adopted, where N is the total number of the designated number of the resource elements and M is the total number of a designated number of positions. Resource elements mapped to the same position in all the groups are used as inputs of the interleaver. Each column output by the interleaver may correspond to one eREG.

Optionally, in a possible implementation manner of this embodiment, the position may further correspond to a DMRS port.

In this embodiment, a mapping unit maps a control channel to an eREG, which corresponds to determined eREG information, among a designated number of eREGs in each unit physical resource block. Each eREG among the designated number of the eREGs is formed by a designated number of resource elements. The designated number of the resource elements are selected from corresponding resource elements at an $S^{th}$ position in each group, S is a positive integer smaller than or equal to N, so that a transmitting unit can transmit the control channel on the eREG mapped by the mapping unit, thereby implementing transmission of some control channels, for example, ePDCCHs, through an eREG in a unit physical resource block.

Figure 10A:
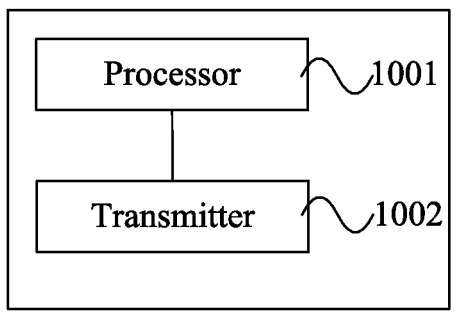
FIG. 10A is a schematic structural diagram of a control channel transmission apparatus according to another embodiment of this application.
Figure 10B:
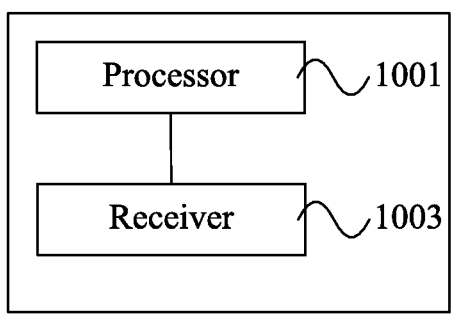
FIG. 10B is a schematic structural diagram of a control channel transmission apparatus according to another embodiment of this application.

FIG. 10A and FIG. 10B are schematic structural diagrams of a control channel transmission apparatus according to another embodiment of this application. As shown in FIG. 10A and FIG. 10B, the control channel transmission apparatus in this embodiment may include a processor 1001 and a transmitter 1002 (FIG. 10A) or a processor 1001 and a receiver 1003 (FIG. 10B). The processor 1001 is configured to determine at least one unit physical resource block for transmitting a control channel. Resource elements included in each unit physical resource block are divided into M groups. Each group includes N resource elements, the N resource elements correspond to N positions. M is an integer greater than or equal to 2 and N is an integer greater than or equal to 1.

The processor 1001 is also configured to determine, according to an aggregation level of the control channel and eREGs included in each eCCE, eREG information of the control channel to be mapped to each unit physical resource block. The processor 1001 is further configured to map, according to the eREG information, the control channel to an eREG, which corresponds to the eREG information, among a designated number of eREGs in each unit physical resource block. Each eREG among the designated number of the eREGs is formed by a designated number of resource elements, the designated number of the resource elements are selected from corresponding resource elements at an $S^{th}$ position in each group, and S is a positive integer smaller than or equal to N.

In the embodiment of FIG. 10A, the transmitter 1002 is configured to transmit the control channel at a position of the eREG in each unit physical resource block. The eREG is mapped by the processor 1001.

In the embodiment of FIG. 10B, the receiver 1003 is configured to receive the control channel that is transmitted at a position of the eREG in each unit physical resource block. The eREG is mapped by the processor 1001.

The control channel may be specifically an enhanced physical downlink control channel (ePDCCH).

Optionally, in a possible implementation manner of this embodiment, the processor 1001 may specifically determine, according to the aggregation level of the control channel, eCCE information of the control channel to be mapped to each unit physical resource block; and determine, according to eREGs included in each eCCE corresponding to the eCCE information, the eREG information of the control channel to be mapped to each unit physical resource block.

Specifically, the eREG information determined by the processor 1001 may include the number of eREGs and an eREG identifier.

Optionally, in a possible implementation manner of this embodiment, the resource elements included in each unit physical resource block may include all resource elements in each unit physical resource block.

Optionally, in a possible implementation manner of this embodiment, the resource elements included in each unit physical resource block may include resource elements other than a resource element to which a reference signal and/or another control channel is mapped among all resource elements in each unit physical resource block.

The reference signal may include, but is not limited to, at least one of a common reference signal (CRS), a DMRS, a channel status information reference signal (CSI-RS), and a positioning reference signal (PRS).

The another control channel may be specifically at least one of a physical downlink control channel (PDCCH), a physical control format indicator channel (PCFICH), and a physical hybrid automatic repeat request indicator channel (PHICH).

Optionally, in a possible implementation manner of this embodiment, the processor 1001 may further divide the resource elements included in each unit physical resource block into at least two groups; then map the N resource elements included in each group to the N positions; and then select a designated number of resource elements from resource elements corresponding, in all groups, to the $S^{th}$ position among the N positions, to form each eREG among the designated number of the eREGs. Specifically, a row-in column-out interleaver with N rows and M columns may be adopted. N is the total number of the designated number of the resource elements and M is the total number of a designated number of positions. Resource elements mapped to the same position in all the groups are used as inputs of the interleaver, and each column output by the interleaver corresponds to one eREG.

Optionally, in a possible implementation manner of this embodiment, the position may further correspond to a DMRS port.

In this embodiment, a processor maps a control channel to an eREG, which corresponds to determined eREG information, among a designated number of eREGs in each unit physical resource block, where each eREG among the designated number of the eREGs is formed by a designated number of resource elements, the designated number of the resource elements are selected from corresponding resource elements at an $S^{th}$ position in each group, and S is a positive integer smaller than or equal to N, so that the transmitter 1002 can transmit the control channel on the eREG mapped by the processor 1001, thereby implementing transmission of some control channels, for example, ePDCCHs, through an eREG in a unit physical resource block.

It can be clearly understood by persons skilled in the art that, for the purpose of convenient and brief description, for a specific working process of the foregoing system, device and unit, reference may be made to a corresponding process in the method embodiments, and details are not described herein again.

In several embodiments provided in this application, it should be understood that the disclosed system, device, and method may be implemented in other ways. For example, the described device embodiments are merely exemplary. For example, the unit division is merely logical function division and can be other division in actual implementation. For example, multiple units or components may be combined or integrated into another system, or some features may be ignored or not performed. In addition, the shown or discussed coupling or direct coupling or communication connection may be accomplished through some interfaces, and indirect coupling or communication connection between devices or units may be electrical, mechanical, or in other forms.

Units described as separate components may be or may not be physically separate. Components shown as units may be or may not be physical units, that is, may be integrated or distributed on multiple network units. Part or all of the units may be selected to achieve the objective of the solutions of the embodiments according to an actual requirement.

In addition, various functional units in the embodiments of this application may be integrated in one processing unit or may exist as various separate physical units, or two or more units may also be integrated in one unit. The integrated unit may be implemented through hardware, or may also be implemented in the form of hardware plus a software functional unit.

The integrated unit implemented in the form of a software functional unit may be stored in a computer readable storage medium. The software functional unit is stored in a storage medium, which includes several instructions to instruct a computer equipment (such as, a personal computer, a server, or a network equipment) or a processor (processor) to perform a part of the steps of the methods as described in the embodiments of this application. The storage medium includes various media capable of storing program codes, such as, a USB flash disk, a mobile hard disk, a read-only memory (ROM), a random access memory (RAM), a magnetic disk, or an optical disk.

Finally, it should be noted that the foregoing embodiments are only provided for describing the technical solutions of this application, but are not intended to limit this application. It should be understood by persons of ordinary skill in the art that although this application has been described in detail with reference to the foregoing embodiments, modifications can still be made to the technical solutions described in the foregoing embodiments, or equivalent replacements can be made to some technical features in the technical solutions, as long as such modifications or replacements do not cause the essence of the corresponding technical solutions to depart from the scope of this application.

What is claimed is:

1. A control channel transmission method, comprising:
   determining at least one unit physical resource block for transmitting a control channel, wherein resource elements comprised in each unit physical resource block are divided into M groups, each group comprises N resource elements, the N resource elements correspond to N positions, M is an integer greater than or equal to 2, and N is an integer greater than or equal to 1;
   determining, according to an aggregation level of the control channel and enhanced resource element groups (eREGs) comprised in each enhanced control channel element eCCE, eREG information of the control channel to be mapped to each unit physical resource block;
   mapping, according to the eREG information, the control channel to a mapped eREG that corresponds to the eREG information, the mapped eREG among a designated number of eREGs in each unit physical resource block, wherein each eREG among the designated number of the eREGs is formed by a designated number of resource elements, the designated number of the resource elements are selected from corresponding resource elements at an $S^{th}$ position in each group, and S is a positive integer smaller than or equal to N; and transmitting the control channel on the mapped eREG.

2. The method according to claim 1, wherein the resource elements comprised in each unit physical resource block comprise all resource elements in each unit physical resource block.

3. The method according to claim 1, wherein the resource elements comprised in each unit physical resource block comprises resource elements other than a resource element to which a reference signal and/or another control channel is mapped among all resource elements in each unit physical resource block.

4. The method according to claim 1, wherein determining, the eREG information comprises:
   determining, according to the aggregation level of the control channel, eCCE information of the control channel to be mapped to each unit physical resource block; and
   determining, according to eREGs comprised in each eCCE corresponding to the eCCE information, the eREG information of the control channel to be mapped to each unit physical resource block.

5. The method according to claim 1, wherein before the mapping, the method further comprises:
   dividing the resource elements comprised in each unit physical resource block into the M groups;
   mapping the N resource elements comprised in each group to the N positions; and
   selecting a designated number of resource elements from resource elements corresponding, in all groups, to the Sth position among the N positions, to form each eREG among the designated number of the eREGs;
   wherein the N resource elements correspond to N positions, M is an integer greater than or equal to 2, and N is an integer greater than or equal to 1.

6. The method according to claim 1, wherein the position corresponds to a demodulation reference signal DMRS port.

7. A control channel transmission apparatus, comprising:
   a processor, and
   a memory comprising instructions that are executable by the processor, the memory comprising instructions for:
   determining at least one unit physical resource block for transmitting a control channel, wherein resource elements comprised in each unit physical resource block are divided into M groups, each group comprises N resource elements, the N resource elements correspond to N positions, M is an integer greater than or equal to 2, and N is an integer greater than or equal to 1;
   determining, according to an aggregation level of the control channel and enhanced resource element groups eREGs comprised in each enhanced control channel element eCCE, eREG information of the control channel to be mapped to each unit physical resource block;
   mapping, according to the eREG information, the control channel to an eREG, which corresponds to the eREG information, among a designated number of eREGs in each unit physical resource block, wherein each eREG among the designated number of the eREGs is formed by a designated number of resource elements, the designated number of the resource elements are selected from corresponding resource elements at an Sth position in each group, and S is a positive integer smaller than or equal to N; and
   a communication device comprising a transmitter or a receiver, wherein the transmitter is configured to transmit the control channel at a position of the eREG in each unit physical resource block, wherein the eREG is mapped by the processor, and wherein the receiver is configured to receive the control channel that is transmitted at a position of the eREG in each unit physical resource block, wherein the eREG is mapped by the processor.

8. The apparatus according to claim 7, wherein the resource elements comprised in each unit physical resource block comprise all resource elements in each unit physical resource block.

9. The apparatus according to claim 7, wherein the resource elements comprised in each unit physical resource block comprise resource elements other than a resource element to which a reference signal and/or another control channel is mapped among all resource elements in each unit physical resource block.

10. The apparatus according to claim 7, wherein the memory further includes instructions for:
    determining, according to the aggregation level of the control channel, eCCE information of the control channel to be mapped to each unit physical resource block; and
    determining, according to eREGs comprised in each eCCE corresponding to the eCCE information, the eREG information of the control channel to be mapped to each unit physical resource block.

11. The apparatus according to claim 7, wherein the memory further includes instructions for:
    dividing the resource elements comprised in each unit physical resource block into at least two groups;
    mapping the N resource elements comprised in each group to the N positions; and
    selecting a designated number of resource elements from resource elements corresponding, in all groups, to the Sth position among the N positions, to form each eREG among the designated number of the eREGs.

12. The apparatus according to claim 7, wherein the position corresponds to a demodulation reference signal DMRS port.

13. The apparatus according to claim 7, wherein the communication device comprises the transmitter, the transmitter configured to transmit the control channel at a position of the eREG in each unit physical resource block, wherein the eREG is mapped by the processor.

14. The apparatus according to claim 7, wherein the communication device comprises the receiver, the receiver configured to receive the control channel that is transmitted at a position of the eREG in each unit physical resource block, wherein the eREG is mapped by the processor.

* * * * *